Fig. 2.

O. N. MOORE.
FARE RECORDING MACHINE.
APPLICATION FILED OCT. 16, 1911.

1,102,942.

Patented July 7, 1914.
6 SHEETS—SHEET 4.

Witnesses
W. Subler
H. S. Smith

Inventor
Otto N. Moore.
By R. J. McCarty
his Attorney

UNITED STATES PATENT OFFICE.

OTTO N. MOORE, OF INDIANAPOLIS, INDIANA, ASSIGNOR TO OHMER FARE REGISTER COMPANY, OF ROCHESTER, NEW YORK.

FARE-RECORDING MACHINE.

1,102,942.  Specification of Letters Patent.  Patented July 7, 1914.

Application filed October 16, 1911. Serial No. 655,090.

*To all whom it may concern:*

Be it known that I, OTTO N. MOORE, a citizen of the United States, residing at Indianapolis, in the county of Marion and State of Indiana, have invented certain new and useful Improvements in Fare-Recording Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fare recording machines, such as may be employed in the collection of fares in public conveyances, such for example as street cars.

The objects of the invention are several, which, briefly stated, are, first, to provide an improved form of fare-recording indicator through the instrumentality of which each fare is concealed when selected for the recording mechanism, and exposed after the operation of said mechanism in recording a fare, thus informing the passenger that the fare paid by him has been rung up or recorded. Secondly, to provide an improved form of fare classification indicator which distinguishes between tickets and cash fare collections, in other words, which shows whether the fare recorded is a ticket or a cash fare. Thirdly, to provide improvements in the feeding mechanism for the paper upon which prints or impressions of the fare collections are made. And fourthly, to provide certain improvements in the platen-controlling mechanism by means of which the cash fares and tickets are differentiated on the prints or impressions taken. These and other objects incidental thereto will be referred to in the following description and pointed out in the claims.

Referring to the accompanying drawings.

*The frame work.*—Referring more particularly to the drawings, 1 represents a base plate, 2 a rear plate, 3 a left side plate and 4 a right side plate, all of which are rigidly united and make up the main frame work of the machine.

Figure 1:
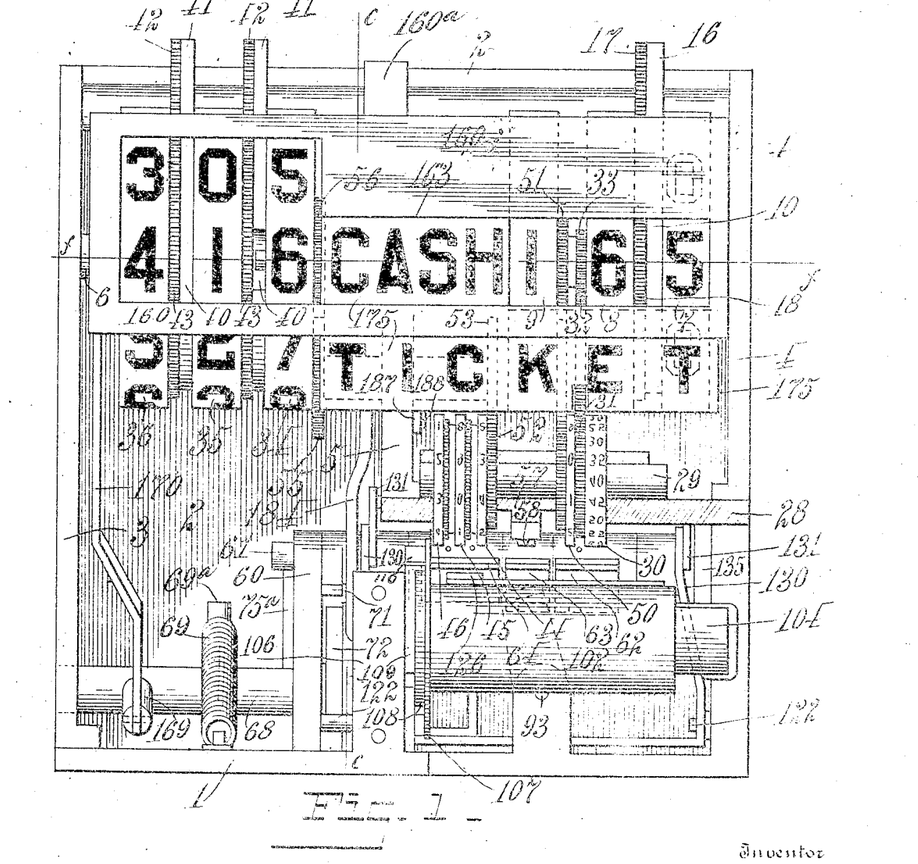
Figure 1 is a front elevation of the machine with the casing removed.
Figure 9:
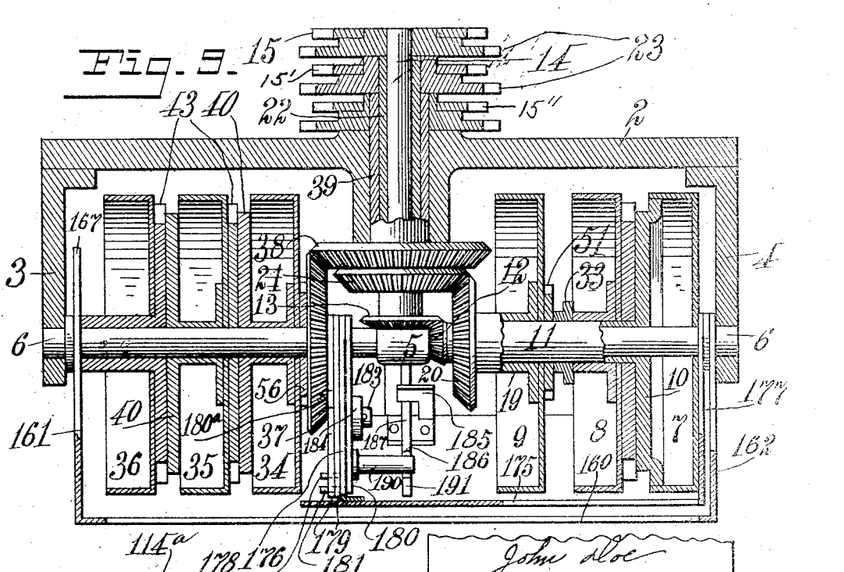
Fig. 9 is a section on the line $f$—$f$ of Fig. 1.

*Fare indicating wheels,* (Figs. 1 and 9.)—Mounted in the side plates 3 and 4, and in an intermediate supporting plate 5, is a shaft 6 on which the cash fare indicating wheels are mounted. The fare indicating wheels consist of a unit wheel 7, a tens wheel 8 and a hundreds or dollar wheel 9. These wheels are set to select the fare as follows. The unit wheel 7 is mounted on a dial 10 attached to, or a part of a telescopic shaft 11 journaled on the shaft 6. The said shaft 11 is provided with a bevel gear 12 in mesh with a bevel gear 13 on a shaft 14 journaled in the rear plate 2. The shaft 14 is provided with a sprocket 15 by means of which the unit wheel 7 is rotated. The tens wheel 8 is set from the unit wheel, and said unit wheel is provided with ten characters 0 and 5 which alternate in their positions. Whenever the unit wheel 7 is rotated so as to indicate one of the "0" indications, the tens wheel 8 is actuated by the well known form of transfer mechanism, consisting of the dial 10, Swiss gear 16, pinion 17, and gear 18 rigidly secured to the tens wheel 8. The hundreds wheel 9 is mounted on a telescopic shaft 19 journaled on the shaft 11 and provided with a bevel gear 20 in mesh with a gear 21 on a telescopic shaft 22. The shaft 22 is journaled in the rear plate 2, and is provided with a sprocket 15′ similar to the sprocket 15 on the shaft 14. To hold the fare-indicating wheels in alinement, the shafts 14 and 22 are provided with dials 23 having recesses 24 which receive the ends of alining pawls 25 pivoted at 26 and controlled by springs 27, see Fig. 2. The selected fare is printed as follows:

*Fare printing wheels,* (Figs. 1 and 9.)— Attached to the side plate 4 and the intermediate plate 5, is a plate 28 which supports a shaft 29. Mounted on said shaft 29 is a unit or tens printing wheel 30 provided with twenty characters adapted to print multiples of five from 0 to 95. The wheel 30 is driven from the telescopic shaft 11 of the unit wheel 7 through gears 31, 32 and 33. The timing of the gears is such that the wheel 30 makes one complete revolution during one complete revolution of the tens wheel 8; and the character on the wheel 30, which is in printing position, corresponds to the character on the wheels 7 and 8, which are in an indicating position. Also mounted on the shaft 29 is a printing wheel 50 in alinement with the printing wheel 30. The wheel 50 is provided with the same characters as those of the hundred or dollar indicating wheel 9, and is actuated concurrently therewith by a train consisting of the gears 51. The hundreds or dollar printing wheel 50, and the dollar indicating wheel 9, may be provided with other indications as will be seen from Fig. 11. In this view, it will be noted that some of the numerical indications are eliminated, and the letters H, E and B substituted. These letters represent Half Fare, Excess Fare and Baggage, and may be printed on the record, as will be seen in Fig. 12 opposite the station number 408.

*Station indicating wheels*, (Figs. 1 and 9.)—Means are provided for indicating the number of the station at which the fare is collected, consisting as follows. Mounted on the shaft 6 are these station indicating wheels, which consist of a unit wheel 34, tens wheel 35, and hundreds wheel 36. The unit wheel 34 is provided with a bevel gear 37 in mesh with a bevel gear 38 on a telescopic shaft 39. The shaft 39 is provided with a sprocket 15″ and an alining dial 23 similar to those of shafts 14 and 22. The sprockets 15, 15′, 15″ are connected by sprocket chains 15ª, to a setting or selecting mechanism such as is shown in my former Patent No. 979,083 of Dec. 20, 1911, or is shown in my co-pending application filed herewith. The unit, tens and hundreds wheels 34, 35 and 36 are primarily a counter, and are adapted to successively expose, when rotated in either direction, the consecutive number of the various stations. Consequently the tens and hundreds indicating wheels may be actuated by any well known form of transfer mechanism, which, in the present case, consists of dials 40, Swiss gears 41, pinions 42, and gears 43.

*Station printing wheels*, (Figs. 1 and 5.)—The station numbers are printed from unit, tens and hundreds printing wheels 44, 45 and 46, mounted on the shaft 29 and in printing alinement with the wheels 30 and 50. The wheels 44, 45 and 46 are primarily a counter, and are provided with any well known form of transfer mechanism 47. The unit printing wheel 44 is driven from the unit indicating wheel 34 by a train consisting of a gear 52, gear 53 mounted on a shaft 54 journaled in the plate 5, gear 55 on said shaft, and a gear 56 in mesh with the gear 55 and mounted on the unit station indicating wheel 34.

*Ticket printing means*, (Fig. 1.)—The plate 28 is provided with a projection 57 bearing a type 58, which is adapted to print an indication on the record representing tickets.

Figure 3:
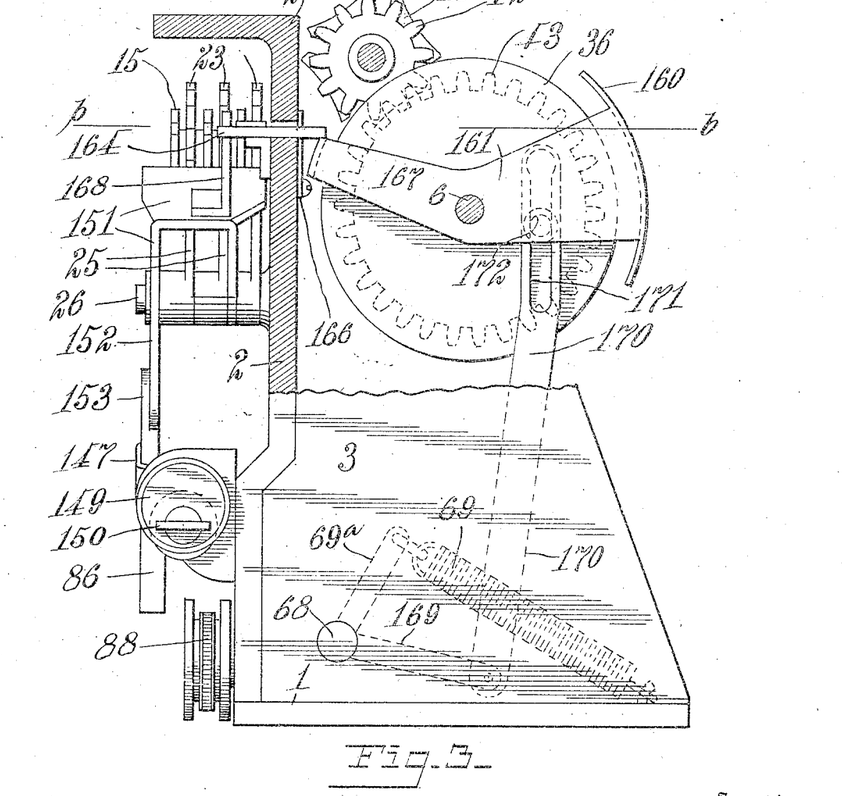
Fig. 3 is an elevation of the left side of the machine partially in section.
Figure 4:
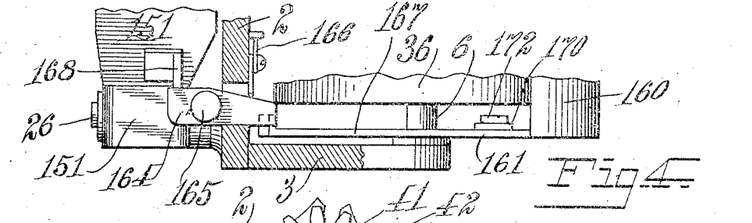
Fig. 4 is a section on the line $a$—$a$ of Fig. 2, and $b$—$b$ of Fig. 3.
Figure 5:
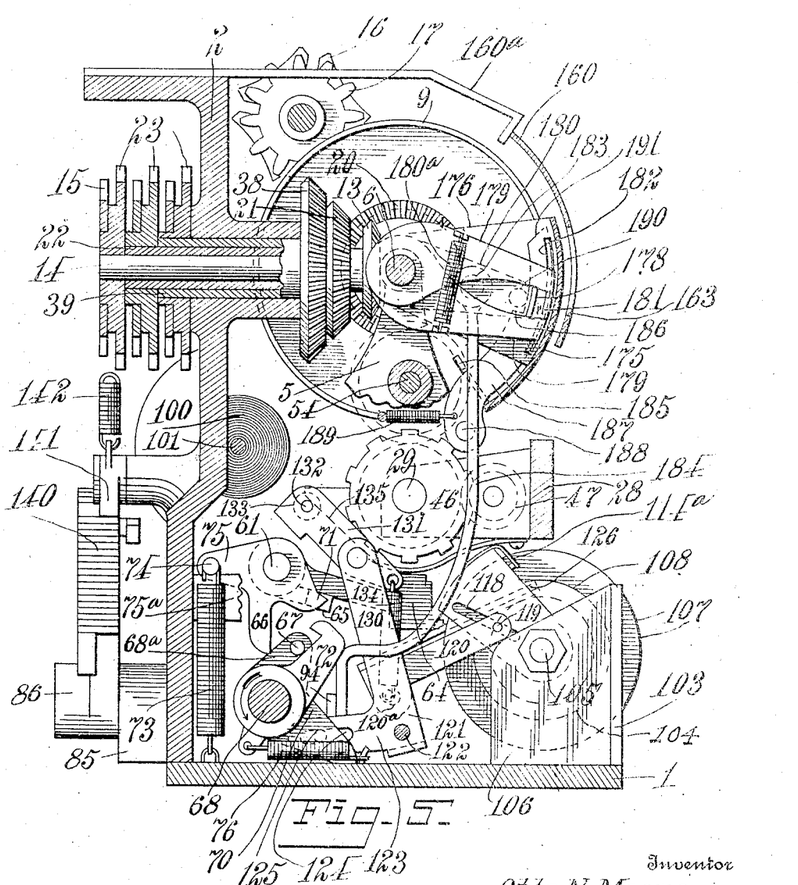
Fig. 5 is a section on the line $c$—$c$ of Fig. 1.
Figure 6:
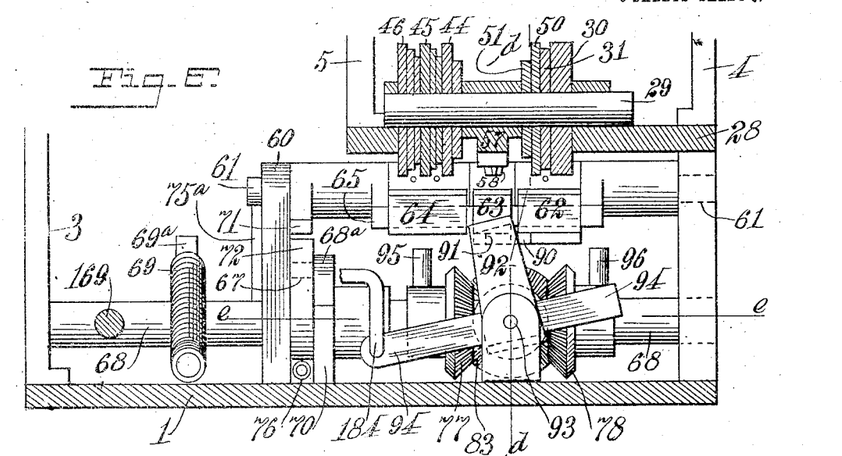
Fig. 6 is a front elevation of the printing mechanism.

*Platen-actuating mechanism*, (Figs. 1, 5, and 6.)—An impression may be taken from the wheels 30, 50, 44, 45 and 46 and the type 58 by the following selective printing means: Mounted in the side plate 4 and in a bearing 60, is a rock shaft 61, having platens 62, 63 and 64 freely mounted thereon. The platen 62 is adapted to engage the fare-printing wheels 30 and 50, the platen 63 is adapted to engage ticket printing type 58, and likewise the platen 64 is adapted to engage the station printing wheels 44, 45 and 46. These platens are adapted to be thrown upwardly against their respective printing members to secure an impression; said platens normally lie in a position away from the printing members to permit the record strip to pass between said platens and printing members. The said platens are held in their normal position by a yoke 65 rigidly attached to the shaft 61, and said platens and yoke are depressed and then thrown upwardly to secure an impression by the following means: Referring particularly to Fig. 5, the shaft 61 is provided with an arm 66 adapted to be engaged by a pin 67 on an arm 68ª mounted on a rock shaft 68. The shaft 68 journaled in the side plates 3 and 4, is partially controlled by a spring 69 attached to the arm 69ª on said shaft 68, as shown in Fig. 3; and is held in a normal position against the tension of the said spring 69 by an arm 70 that engages the base plate 1. When the said shaft 68 is rocked in the direction of the arrow, shown in Fig. 5, the pin 67 engages the arm 66 and depresses the yoke 65 and the platens, until a projection 71 on the shaft 61 is caught by a latch 72, which is freely mounted on the shaft 68 and controlled by a spring 76. When the rock shaft 68 is returned to its normal position under the influence of the spring 69, the pin 67 engages the latch 72 and releases the projection 71, and permits the platens and the yoke 65 to be moved upwardly under the influence of a spring 73 attached to the base plate 1 and to a pin 74 on an arm 75 rigidly secured to the rock shaft 61. When the yoke reaches its normal position, the pin 74 strikes a projection 75ª on the bearing 60 which permits the platens to have an extended movement to engage their respective printing members to secure an impression. The shaft 68 is rocked in the direction of the arrow by the following means, see Figs. 7 and 8:

Freely mounted on the shaft 68 are two miter gears 77 and 78, the hubs of which are provided with shoulders 79 and 80 respectively, adapted to engage respective pins 81 and 82 secured to the shaft 68. Both gears 77 and 78 are in mesh with a miter gear 83 mounted on a shaft 84 and journaled in a bearing 85. When the gear 83 is rotated in one direction, the shoulder 79 will engage the pin 81, the shoulder 80 will recede from the pin 82, and the shaft 68 will be rocked in the direction of the arrow shown in Fig. 5. When the gear 83 is rotated in the opposite direction, the shoulder 80 will engage the pin 82, the shoulder 79 will recede from the pin 81, and the shaft 68 will be rocked in the same direction, as a consequence the shaft 68 will be rocked in the same direction irrespective of the direction of rotation of the gear 83. The gear 83 and shaft 84 are rocked by a segment 86 having elongated flexible members such as chains 87 and 88 attached thereto, see Fig. 2. The chains 87 and 88 extend out through the car in which the recorder is placed. One of said chains or flexible members, towit, 87, is pulled when it is desired to record a cash fare, and the other member, towit, 88 is pulled when it is desired to record a ticket. The direction of rotation of the gear 83 is determined by selecting the flexible member 87 or 88.

When the flexible member 87 is pulled to record a cash fare, the extended movement of the ticket platen 63 is retarded. Similarly, when the member 88 is pulled to record a ticket, the extended movement of the cash-fare platen 62 is retarded, which prevents the platens engaging their respective printing members. These results are accomplished by the following mechanism, see Figs. 6, 7 and 8. Each of the platens 62 and 63 is provided with projections 90 and 91 respectively, which are adapted to be engaged, singly, by an arm 92 pivoted on a shaft 93 and attached to a lever 94 also pivoted on the shaft 93. The ends of the lever 94 are adapted to be engaged by pins 95 and 96 secured to the hubs of the gears 77 and 78 respectively. When the gear 83 is rotated in one direction to register a cash fare, the pin 95 will engage one end of the lever 94 and move the arm 92 in the path of the projection 91, which prevents the platen 63 engaging the type member 58. When the gear 83 is rotated in the opposite direction to register a ticket, for example, the pin 96 will engage the other end of the lever 94 and move the arm 92 in the path of the projection 90, thereby preventing the platen 62 engaging the fare printing wheels 30 and 50 and thus preventing the securing of an impression thereof. In both cases, however, the platen 64 is allowed to engage the station printing wheels 44, 45 and 46. This result is clearly shown in Fig. 12, which illustrates a portion of the printed record. In this view, column 97 is the station number column, column 98, the ticket column, and column 99 the cash fare column. It will be noted that, whenever a ticket indication is printed opposite a station number, the cash indication is eliminated, and vice versa.

*Paper feeding mechanism.* (See Figs. 1, 5, 7 and 10.)—Extending from a paper roll 100, mounted on a shaft 101 supported in plates 4 and 5, is a paper strip 102 which extends between the platens and printing type members. The paper strip 102 passes in front of a plate 103, and the end thereof is attached to a winding cylinder 104. The cylinder 104 is mounted on a shaft 105 secured to a projection 106 extending from the base 1 and to which the plate 103 is also attached. The said cylinder 104 is intermittently rotated to feed the paper strip by the following mechanisms: Mounted on the cylinder 104 is a dial 107 and a ratchet disk 108. Freely mounted on the cylinder shaft 105 is a lever 109 provided with a plate 110 in alinement with the ratchet disk 108. The plate 110, in connection with the disk 108, forms a wedge-shaped slot 111 which receives a roller 112. The roller 112 is wedged in the slot 111 by a pin 113 controlled by a spring 114$^a$. When the lever 109 is moved in the direction of the arrow in Fig. 10, said motion is communicated to the disk 108 and cylinder 104 by the roller 112. When said lever 109 is returned to its normal position, or that shown in Fig. 10, any retrograde movement thereof is prevented from being communicated to the disk 108 cylinder 104 by a ratchet roller 114 lying in a wedge shaped recess 115 and wedged therein by a pin 116 controlled by a spring 117. The said lever 109 is actuated by the following mechanism: The said lever is provided with an elongated slot 118 which receives a pin 119 on an arm 120, see Fig. 5. The arm 120 is pivoted at 120$^a$ to a member 121, which in turn is pivoted on studs 122 on the bearing 60 and side plate 4. The member 121 is provided with an arm 123 having a slot 124, which receives a pin 125 on the projection 70 mounted on the rock shaft 68 before referred to. When the rock shaft 68 is actuated, the lever 109 is also actuated and the cylinder 104 rotated. The position of the pin 119 in the slot 118 determines the amount of movement given said lever 109 and the cylinder 104. This position is controlled by the diameter of the roll of paper 102 on the cylinder 104. The arm 120 has secured thereto an arm 126 that engages the surface of the roll of paper on the cylinder 104. The inclination of the slot 118 will maintain the arm 126 in engagement with the paper or any other well known means may be employed for this. When the roll of paper is of small diameter, the pin 19 will be at the bottom of the slot, and when said roll is of larger diameter, said pin 119 will lie near the outer end of the slot. The movement imparted to the cylinder 104, when the pin 119 is at the outer end of the slot, will be less than when the pin is at the lower end of said slot, which compensates for the varying size of the paper roll. The arrangement is such that the same distance of feeding movement will always be imparted to the paper strip irrespective of the size of the paper roll on the cylinder 104.

*Inking mechanism*, (Figs. 1 and 5.)—The member 121 is provided with arms 130 which support a pivotal frame 131 provided with a shaft 132 having an inking roll 133 mounted thereon. The frame 131 is partially controlled by a spring 134, and the end of the shaft 132 is in engagement with a member 135, mounted on the side plate 4, and which guides the inking roller 133 beneath the printing type members when the shaft 68 is rocked and the member 121 is actuated.

*Locking devices*, (Fig. 2.)—The segment 86 is provided on its periphery with a plurality of teeth 140 which are in operative relation with a pawl 141 controlled by a spring 142, and which constitute a well known form of full stroke mechanism. The periphery of the segment 86 is also provided with a recess 143 adapted to receive the end 144 of a locking lever 146 pivoted at 145 and partially controlled by a spring 154. The lever 146 is adapted to be thrown into engagement with the segment 86 at the recess 143 by a lever 147 pivoted at 145 and controlled by a cam 148, said cam 148 being actuated by any well known type of lock 149 having a key 150. The key 150 may be carried by the conductor and through the agency of the above described mechanism, the recording portion of the machine is locked when the machine is not in use. The segment 86 is also adapted to be locked by the lever 146 when a fare or station is being selected, thereby preventing a misprint on the record.

Figure 2:
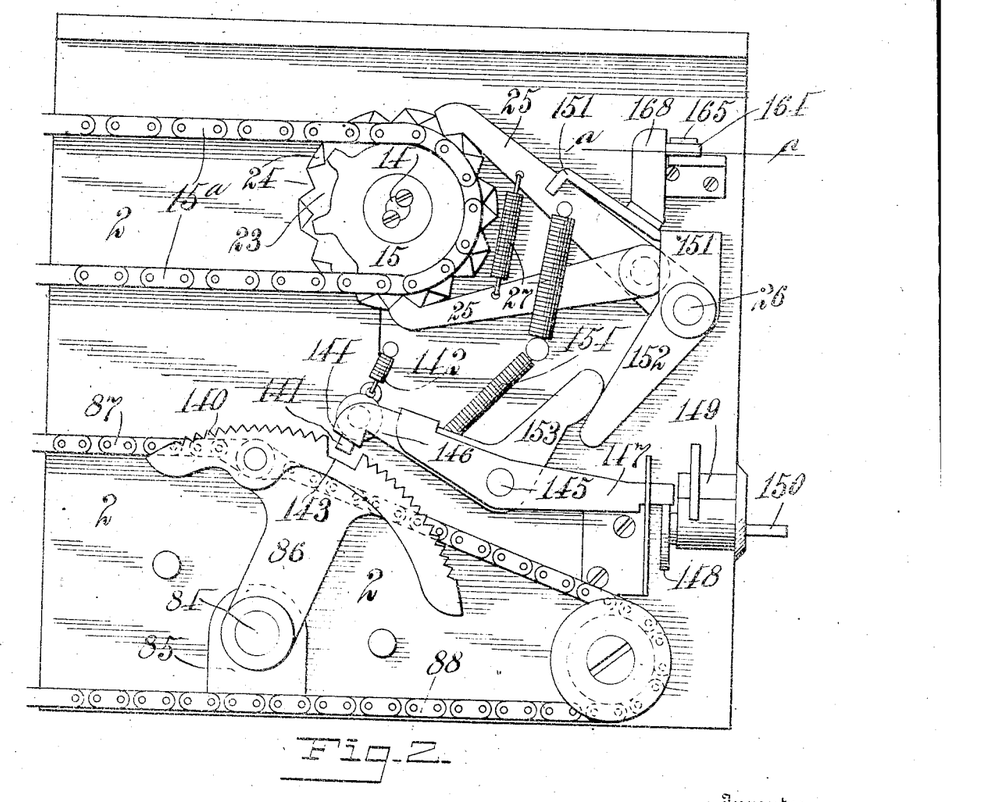
Fig. 2 is a rear elevation.

Adapted to engage all of the alining pawls 25 of the fare and station indicating wheels is a frame 151 pivoted at 26 and provided with an arm 152 adapted to engage an arm 153 on the lever 146. When the alining dials 23 are rotated, to set the indicating fare and station wheels, the pawls 25 ride out of the recesses 24 in the dials 23 and rock the frame 151, thereby actuating the lever 146 and placing the end 144 in engagement with the segment at the recess 143.

*Fare recording indicator or blind*, (Figs. 1, 2, 3 and 4.)—Mounted in front of the fare indicating wheels 7, 8 and 9, is a vertically reciprocating blind or shield 160 supported on side members 161 and 162 pivoted on the shaft 6, adjacent to the side plates 3 and 4. The blind 160 is provided with an opening 163, which, when said blind is in an elevated position, exposes the "Cash" fare on the wheels 7, 8 and 9, and the "Cash" indication or "Ticket" indication on an indicator 175 hereinafter referred to. The blind 160 falls by gravity, and is held in its upper position by a pawl 164 pivoted at 165 and partially controlled by a spring 166. The pawl 164 engages a projection 167 of the side member 161, and is actuated to release the blind or shield 160 during the initial setting movement of the fare indicating wheels.

When a fare indicating wheel is initially rotated to select the fare to be recorded, the alining pawl 25 will move out of one of the recesses 24 in its respective dial 23, which operation will actuate the frame 151, as before described. The frame 151 carries an arm 168 adapted to engage the pawl 164 and thereby release the blind 160 to conceal the fare indication. When the fare is recorded by rocking the shaft 68, the blind is elevated by an arm 169 on the rock shaft 68 and a connecting rod 170. The rod 170 is provided with an elongated orifice 171, which receives a pin 172 on the side member 161 of the blind. When the shaft 68 is rocked and the blind is in its lower position, the lower terminal of the orifice 171 will engage the pin 172 and move said blind to its upper position, where it will be held by the pawl 164 until another fare is selected. The upward movement of the blind may be limited by a stop 160ª attached to the plate 2. When said blind is elevated and discloses the fare, it indicates to the passengers that the fare has been recorded.

*Fare classification indicator*, (Figs. 1, 5 and 9.)—To indicate to the occupants of the car that the fare recorded is a ticket or a cash fare, the following indicator is provided. Mounted in front of the fare indicating wheels, and in the rear of the blind 160, is an oscillating indicator 175 supported on arms or side members 176 and 177 pivoted on the shaft 6 and lying adjacent to the plates 5 and 4. The said indicator 175 bears on its face the words "Cash" and "Ticket," and is adapted to be moved alternately to a position to indicate the classification of the fare being recorded, whether cash or a ticket, when the platen mechanism is actuated. The indicator 175 is actuated by the movement of the segment 86 through the lever 94 before referred to. The connection between the indicator 175 and the lever 94 is a resilient one to prevent the sudden action of the lever 94 being communicated to the indicator, and is constructed as follows: The side member 176 of said indicator is provided with a projection 178, which lies between two members or arms 179 freely mounted on the shaft 6. The said arms 179 are connected by a spring 180ª which draws them together against the projection 178. When the arms 179 are reciprocated, the indicator 175 will also be reciprocated, but the said indicator may have an independent movement. The arms 179 are reciprocated by a member 180 freely mounted on the shaft 6. The member 180 is provided with a projection 181 extending through a slot 182 in the side member 176, and which lies between the arms 179. Attached to the member 180 at a pivot 183, is one end of a connecting rod 184, the other end of which is attached to the lever 94. See Fig. 6. When the lever 94 is actuated by the pin 96, the indicator 175 will be elevated, and will be held in such position by a projection 185 on the indicator 175 engaging a shoulder 186 on a pawl 187. The pawl 187 is pivoted at 188 to the plate 5, and is partially controlled by a spring 189. See Fig. 5. The member 180 carries a pin 190 adapted to engage a cam surface 191 on the upper end of the pawl 187 when the indicator is in its upper position. When the lever 94 is actuated by the pin 95, the member 180 will be depressed and the pin 190 will engage the cam surface 199, thereby actuating the pawl 187, releasing the projection 185 and permitting the indicator 175 to be depressed by the member 180. The relative movement between the member 180 and the indicator 175, which occurs before the projection 185 is released, will be compensated for by the spring 180ª. It will be remembered that when it is desired to record or print a cash fare, the segment 86 is actuated to cause the pin 95 to engage the lever 94, and it will be further noted that, when said pin engages said lever, the indicator 175 is lowered to expose the "Cash" indication on the indicator 175. Similarly, when the segment 86 is actuated to cause the pin 96 to engage the lever 94, a ticket indication will be recorded on the record, and the indicator 175 will be elevated, thereby exposing the "Ticket" indication of the indicator 175.

Figure 7:
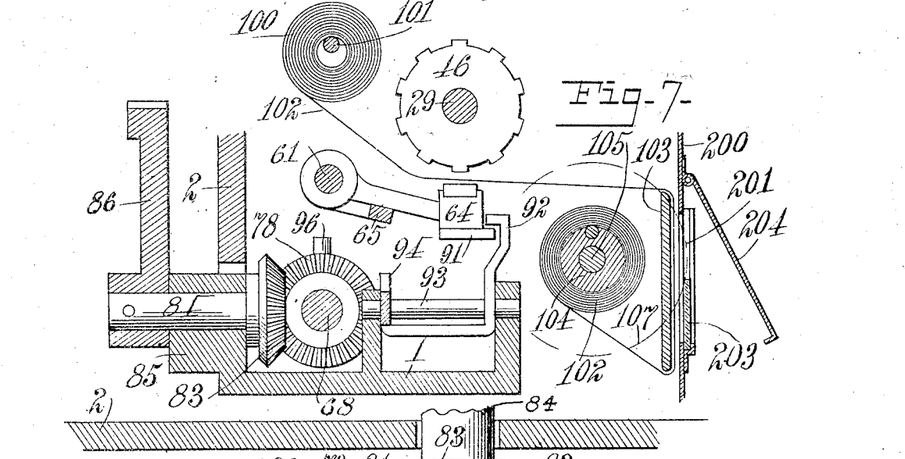
Fig. 7 is a section on the line $d$—$d$ of Fig. 6.
Figure 8:
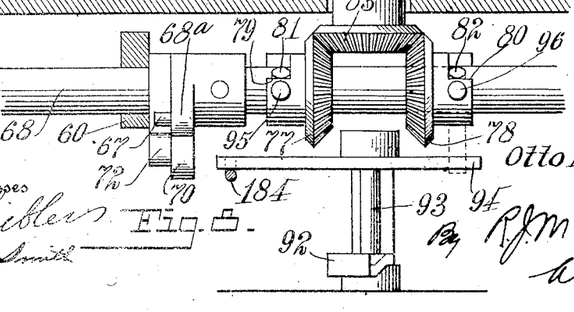
Fig. 8 is a section on the line $e$—$e$ of Fig. 6.
Figures 10, 11, 12:
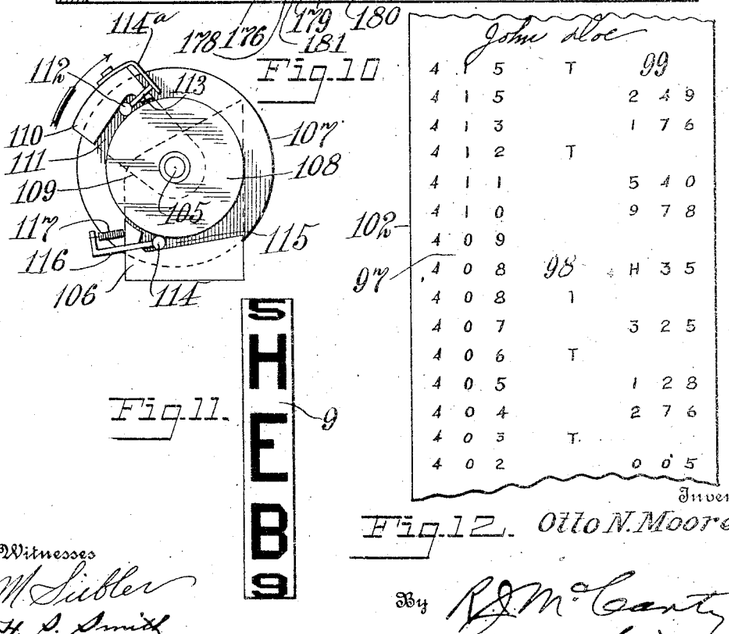
Fig. 10 is a detail view of the paper-feeding mechanism.
Fig. 11 is a detail view of the hundred or dollar fare indicator.
Fig. 12 is a view of the printed record.

*Identification means.*—The machine is provided with a casing 200, a portion of which is shown in front of the plate 103 in Fig. 7. This casing 200 is provided with an opening 201 partially closed by a glass plate 203, and may be closed by a door 204. This casing enables the conductor to attach his signature to the record, as is shown in Fig. 12 by the signature "John Doe." The cylinder 104 may be rotated to expose a blank space on the record, by the dial 107, which extends out through the casing, as will be seen from Fig. 7. The purpose of the glass plate 200 is to permit the name of the first or preceding conductor to be viewed, when the record is advanced for the signature of a second or subsequent conductor.

Without limiting myself to the precise arrangement and structural details shown and described, which may be varied within the scope of the claims, I claim:

1. In a machine of the type specified, selective platen mechanism, and a fare denomination indicator actuated by said platen mechanism.

2. In a machine of the type specified, selective platen mechanism, and a fare denomination indicator suitably connected to said platen mechanism and actuated thereby.

3. In a machine of the type specified, recording mechanism, a fare denomination indicator, a member resiliently attached to said indicator, and connecting means between said member and said recording mechanism.

4. In a machine of the type specified, a fare denomination indicator, arms resiliently connected thereto, an actuating member in operative relation with said arms, and actuating means connected to said actuating member.

5. In a machine of the type specified, a fare denomination indicator having a projection thereon, arms lying on either side of said projection, a spring connecting said arms, an actuating member lying between said arms, and operating means for said actuating member.

6. In a machine of the type specified, a fare denomination indicator, a pawl adapted to hold said indicator in an elevated position, an actuating member adapted when moved in one direction to elevate said indicator and when moved in another direction to release said pawl to permit said indicator to be lowered.

7. In a machine of the type specified, a fare denomination indicator, a pawl adapted to hold said indicator in an elevated position, an actuating member resiliently connected to said indicator and adapted to move said indicator to an elevated position, and to release said pawl to permit the indicator to be lowered.

8. In a machine of the type specified, a fare denomination indicator, a pawl adapted to hold said indicator in one position, and an actuating member adapted to move said indicator to such position, said actuating member also adapted to release said pawl and to move said indicator to the other position.

9. In a machine of the type specified, a fare denomination indicator, a pawl adapted to hold said indicator in an elevated position, resilient means in engagement with said indicator, an actuating member in engagement with said resilient means and adapted to release said pawl and to shift said indicator.

10. In a machine of the type specified, a fare denomination indicator provided with projections, a pawl adapted to be engaged by one of said projections to hold said indicator in an elevated position, arms engaging the other of said projections, a spring connecting said arms, an actuating member engaging said arms, and a pin mounted on said actuating member and adapted to engage said pawl to release the indicator, whereby said indicator is shifted in either direction by said actuating member.

11. In a machine of the type specified, a plurality of independently movable platens, means permitting the actuation of said platens, and means for limiting the movement of one of said platens, said limiting means being controlled by said former means.

12. In a device of the type specified, a plurality of independently movable platens, means permitting the actuation of said platens, an arm adapted to engage one of said platens to limit the movement thereof, said arm being controlled by said former means.

13. In a machine of the type specified, a plurality of independently movable platens, means permitting the actuation of said platens including a rock shaft, and miter gears mounted on said shaft and adapted to actuate the same, means for rotating said gears in opposite directions, a lever adapted to be actuated by said gears, and an arm controlled by said lever and adapted to limit the movement of one of said platens.

14. In a device of the type specified, a plurality of independently movable platens, a rock shaft operatively connected with said platens and adapted to permit the actuation of the same, an arm adapted to limit the movement of one of the platens, a lever connected to said arm, members mounted on said shaft and rotatable in opposite directions and adapted to actuate said lever, said members being also adapted to actuate said shaft, and means for actuating said members.

15. In a device of the type specified, a plurality of independently movable platens, a rock shaft operatively connected with said platens and adapted to permit the actuation of the same, an arm adapted to limit the movement of one of the platens, a lever to which said arm is attached, gears freely mounted on said shaft, said gears being rotatable in opposite directions and adapted to rock said lever, said gears being also provided with abutting portions which engage portions of the shaft to actuate the same, and a driving gear in mesh with said miter gears.

16. In a device of the type specified, a plurality of independently movable platens, a rock shaft operatively connected with said platens and adapted to permit the actuation of the same, an arm adapted to limit the movement of one of the platens, a lever to which said arm is attached, gears freely mounted on said shaft, a driving gear adapted to rotate said gears in opposite directions, pins mounted on said shaft, said gears being provided with shoulders adapted to engage said pin to actuate the shaft and pins mounted on said gears and adapted to engage said lever to shift said arm.

17. In a machine of the type specified, a plurality of independently movable platens, means for actuating said platens, means for limiting the movement of one of said platens, and an indicator actuated by said limiting means.

18. In a machine of the type specified, a plurality of independently movable platens, means permitting the actuation of said platens, means for limiting the movement of one of said platens, said limiting means being controlled by said first named means, and an indicator controlled by said limiting means.

19. In a machine of the type specified, a plurality of independently movable platens, means permitting the actuation of said platens, an arm adapted to engage one of said platens to limit the movement thereof, said arm being controlled by said first named means, and an indicator actuated by said actuating means concurrently with said arm.

20. In a machine of the type specified, a plurality of independently movable platens, a rock shaft operatively connected with said platens and adapted to permit the actuation of the same, an arm adapted to limit the movement of one of the platens, a lever to which said arm is attached, gears freely mounted on said shaft, said gears being rotatable in opposite directions and adapted to rock said lever, said gears being also provided with abutting portions which engage the shaft to actuate the same, a driving gear in mesh with said gears, and an indicator operatively connected with said lever.

In testimony whereof I affix my signature, in presence of two witnesses.

OTTO N. MOORE.

Witnesses:
FRANK A. FAHLE,
GEO. E. SCHLEY.